(12) United States Patent
Kaylo et al.

(10) Patent No.: US 6,410,635 B1
(45) Date of Patent: Jun. 25, 2002

(54) CURABLE COATING COMPOSITIONS CONTAINING HIGH ASPECT RATIO CLAYS

(75) Inventors: Alan J. Kaylo, Glenshaw; Richard F. Karabin, Ruffs Dale, both of PA (US); Tie Lan, Lake Zurich, IL (US); Michael G. Sandala, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/255,207

(22) Filed: Feb. 22, 1999

(51) Int. Cl.⁷ .......................... C08K 3/34; C08G 59/42; C08G 59/50
(52) U.S. Cl. .................. 524/447; 523/415; 523/416; 523/521; 524/789; 528/113; 528/905
(58) Field of Search ................ 524/789, 447; 523/521, 415, 416; 528/113, 905

(56) References Cited

U.S. PATENT DOCUMENTS

| | | | | |
|---|---|---|---|---|
| 3,585,162 A | * | 6/1971 | Sapp | 524/789 |
| 4,379,007 A | | 4/1983 | Fifer et al. | 149/22 |
| 4,431,756 A | * | 2/1984 | Andrews | 523/415 X |
| 4,472,538 A | | 9/1984 | Kamigaito et al. | 523/202 |
| 4,558,075 A | * | 12/1985 | Suss et al. | 524/447 X |
| 4,739,007 A | | 4/1988 | Okada et al. | 524/789 |
| 4,798,746 A | * | 1/1989 | Claar et al. | 525/207 X |
| 4,800,041 A | | 1/1989 | Tymon et al. | 252/378 R |
| 4,889,885 A | | 12/1989 | Usuki et al. | 524/445 |
| 4,894,411 A | | 1/1990 | Okada et al. | 524/710 |
| 5,091,462 A | | 2/1992 | Fukui et al. | 524/504 |
| 5,102,948 A | | 4/1992 | Deguchi et al. | 524/789 |
| 5,164,440 A | | 11/1992 | Deguchi et al. | 524/444 |
| 5,206,284 A | | 4/1993 | Fukui et al. | 524/504 |
| 5,210,154 A | * | 5/1993 | Weidemeier et al. | 523/415 X |
| 5,391,437 A | | 2/1995 | Miyasaka et al. | 428/425.5 |
| 5,428,094 A | | 6/1995 | Tokoh et al. | 524/379 |
| 5,552,469 A | | 9/1996 | Beall et al. | 524/445 |
| 5,578,672 A | | 11/1996 | Beall et al. | 524/446 |
| 5,693,696 A | * | 12/1997 | Garrett et al. | 524/447 X |
| 5,698,624 A | | 12/1997 | Beall et al. | 524/446 |
| 5,721,306 A | | 2/1998 | Tsipursky et al. | 524/449 |
| 5,760,121 A | | 6/1998 | Beall et al. | 524/450 |
| 5,804,613 A | | 9/1998 | Beall et al. | 523/200 |
| 5,849,830 A | * | 12/1998 | Tsipursky et al. | 524/447 X |
| 5,853,886 A | | 12/1998 | Pinnavaia et al. | 428/403 |
| 5,874,173 A | * | 2/1999 | Wenning | 528/905 X |
| 6,107,387 A | * | 8/2000 | Kaylo et al. | 524/447 X |

OTHER PUBLICATIONS

Arimitsu Usuki et al., "Synthesis of nylon 6–clay hybrid", *J. Mater. Res*, vol. 8, No. 5 (May 1993).

* cited by examiner

Primary Examiner—Richard D. Lovering

(57) ABSTRACT

Provided are curable coating compositions comprised of any of a variety of film-forming polymers containing reactive functional groups, a curing agent containing functional groups which are reactive with the functional groups of the polymer, and an exfoliated silicate material derived from a layered silicate which has been exfoliated with a polymer which is compatible with both the film-forming polymer and the curing agent. The inclusion of the exfoliated silicate material enhances coating properties such as adhesion, appearance, crater resistance, and rheology control.

24 Claims, No Drawings

CURABLE COATING COMPOSITIONS CONTAINING HIGH ASPECT RATIO CLAYS

FIELD OF THE INVENTION

The present invention relates to a curable coating composition containing an exfoliated silicate material which has been found to enhanced coating properties such as adhesion, appearance, crater resistance, and rheology control.

BACKGROUND OF THE INVENTION

Due to their low cost and commercial availability, the use of clay minerals as rheology modifiers and/or fillers in coating compositions is common. Traditionally these have included such clay minerals as wollastonite, attapulgite, kaolin, talc, mica and calcium carbonate. These materials have been incorporated in both treated and untreated forms, the most common treatment being silanization, to compatibilize the mineral hydrophilic surface with the host polymer. However, a high level of these conventional clays is needed, e.g., 3 to 10 percent by weight base on total solids of the coating composition, to effectuate adequate rheology control in curable coating compositions. At these levels other properties, such as liquid coating properties, for example, working viscosity and storage stability, and cured coating properties, such as appearance and adhesion, can be adversely affected. Minerals such as mica and talc, which are layered silicate materials, i.e., phyllosilicates, have a platy morphology with typical aspect ratios (the ratio of particle width to particle thickness=aspect ratio) of less than 50. These materials are commonly known for use in coatings as rheology modifiers and fillers and, in addition, due to parallel interlamination of the silicate layers, can improve barrier properties.

Also known in the art is the preparation of aqueous dispersions of exfoliated layered silicate materials, such as vermiculite and bentonite clays. Generally, the clay particles are contacted with an ionic solution to effect cation exchange within the interlayer spacing, thereby permitting swelling of the spacing to bring about delamination (or "exfoliation") upon immersion in aqueous media. These ionic solutions typically contain lithium, alkyl ammonium and/or ammonium carboxylic acid cations. The exfoliated particles are then dispersed under high shear. These dispersions can be used to form or cast films by using drawdown or spraying techniques followed by evaporation of the aqueous phase.

Additionally, it is known to use smectite minerals, particularly montmorillonite clays, in plastic composite materials. These materials are a family of clays having a 2:1 layer structure and, typically, aspect ratios ranging from about 200 to 2,000, which are orders of magnitude greater than for conventional fillers such as mica and talc. The clays are treated with polymers which contain functional groups, e.g., hydroxyl, amine, and amide groups, to enlarge the interlayer spacing such that insertion and ionic attachment of organic molecules to the platelet surfaces can occur (a process known as "intercalation" with the product formed thereby being known as an "intercalate"). During a subsequent polymerization/compounding step in composite formation, individual platelets flake off or exfoliate and are embedded throughout the polymer matrix.

Such polymer-clay composites are described in U.S. Pat. No. 5,853,886 wherein a proton-exchanged layered silicate is intercalated with a basic group-containing polymerizing component. The intercalate is then contacted with a thermoset or a thermoplastic resin system which reacts with the polymerizing component thereby exfoliating the intercalate and forming a hybrid polymer-clay composite.

Although the art teaches the use of the above-described dispersions to form films of exfoliated layered silicate materials, the prior art does not disclose the use of such dispersions in protective or decorative coating compositions. Moreover, although the art teaches the intercalation of layered silicate materials with a polymer containing functional groups, with subsequent exfoliation in the presence of a host polymer to form platelet/polymer composite materials, there is no teaching in the prior art to use layered silicate materials which are exfoliated with functional group-containing polymers in coating compositions, that is, compositions which are deposited on a substrate from a fluid medium, such as a liquid medium, then coalesce on the substrate to form a substantially continuous film.

It has been found that the inclusion in coating compositions of exfoliated silicate materials which are derived from layered silicates, such as montmorillonite clays, and which have been exfoliated with a functional group-containing polymer, provides improved properties such as adhesion, appearance, crater resistance, and rheology control. Moreover, it has been found that these exfoliated silicate materials effectuate these improved properties at levels much lower than those levels needed for more conventional clay materials and, therefore, liquid coating properties, such as storage stability and working viscosity, and cured coating properties, such as adhesion and appearance are not adversely affected.

SUMMARY OF THE INVENTION

In accordance with the present invention, provided is a curable coating composition comprised of the following components:

(a) a polymer containing reactive functional groups;

(b) a curing agent containing functional groups which are reactive with the functional groups of (a); and (c) an exfoliated silicate material derived from a layered silicate which has been exfoliated with a polymer, the polymer being compatible with the polymer (a) and the curing agent (b). The curable coating compositions are useful as both ambient- and thermally-cured coating compositions which provide enhanced properties such as stability, working viscosity, appearance, adhesion, crater resistance and rheology control.

Other than in the operating examples, or where otherwise indicated, all numbers expressing quantities of ingredients or reaction conditions used in the specification and claims are to be understood as modified in all instances by the term "about". As used herein, the term "polymer" is meant to include oligomers.

DETAILED DESCRIPTION OF THE INVENTION

Layered silicate materials suitable for use in component (c) of the curable coating compositions of the invention described immediately above include any clay mineral having a platy morphology which is characterized by a layered lattice structure in which the silicate layer units have a thickness of up to 25 Å, preferably 5 to 15 Å, more preferably 5 to 10 Å, and an interlayer spacing capable of expanding at least 5 Å. Usually, the layers are separated by exchangeable cations metals associated with water molecules. Useful layered silicates include, but are not limited to, phyllosilicates, such as smectite clay minerals, for example montmorillonite, particularly sodium montmorillonite, calcium montmorillonite and/or magnesium montmorillonite; nontronite; biedellite; volkonskonite;

hectorite; saponite; sauconite; sobockite; stevensite; svinfordite; vermiculite and the like. Other useful layered materials include micaceous minerals such as illite and mixed layered illite/smectite minerals.

Preferably, the layered silicates employed in the curable compositions of the invention have a cation exchange capacity (a measure of charge density on the surface of the clay particle) of 30 to 200 milliequivalents of cation per 100 grams of layered silicate.

Preferred layered silicate materials are phyllosilicates of the 2:1 type having a negative charge on the layers and a commensurate number of exchangeable cations in the interlayer spaces. More preferably, the layered silicate materials are smectite clay minerals such as montmorillonite; nontronite; biedellite; volkonskonite; hectorite; saponite; sauconite; sobockite; stevensite; and svinfordite. The most preferred of these being montmorillonite materials, preferably those which contain, within the interlayer spacing, exchangeable cations of alkaline or alkaline earth metals, preferably $Ca^{+2}$ and $Na^+$, which are associated with water molecules.

As used herein, the term "interlayer spacing" refers to the space between the internal faces of the adjacent layers as they are naturally assembled in the layered material before exfoliation of the individual layers or platelets. It should be appreciated that in this state, these materials do not readily exfoliate, regardless of the degree of shear applied, because the interlayer cohesive forces are relatively strong.

The layered silicate materials which are useful in the coating compositions of the invention typically have aspect ratios of at least 200, preferably at least 500. Also, the layered silicate materials typically have aspect ratios less than 2,000. The aspect ratios of the layered silicate materials may range between any combination of these values, inclusive of the recited values.

As indicated above, in component (c) the layered silicate material is exfoliated with a polymer ("the exfoliating polymer") which is compatible with the polymer containing reactive functional groups (a) and the curing agent (b). The exfoliating polymer of (c) and the polymer containing reactive functional groups (a) can be the same or different provided that the respective polymers are compatible. By "compatible" is meant that the exfoliating polymer of component (c) will neither gel the composition by too readily reacting with the polymer (a) and/or the curing agent (b), nor adversely affect cure of the composition by interfering with the curing reaction between (a) and (b). Additionally, the exfoliating polymer of component (c) and the polymer containing reactive functional groups (a) are physically compatible, that is, when blended together, the two polymers form a clear homogeneous mixture or solution. Preferably, the exfoliating polymer will have groups which are reactive with the functional groups of the polymer (a) or the functional groups of the curing agent (b).

The exfoliating polymer of component (c) can be any of a variety of polymers which are commonly known in the art. Preferably, the exfoliating polymer is selected from the group consisting of polymers prepared from polymerizable ethylenically unsaturated monomers, polyester polymers, polyurethane polymers, silicon-based polymers, and polyether polymers. The exfoliating polymer typically contains functional groups, examples of which include, but are not limited to, OH, COOH, NCO, carboxylate, primary and/or secondary amine, amide, carbamate and epoxy functional groups. It is preferred that the layered silicate material of component (c) is exfoliated with a hydroxyl group-containing polymer, a carboxyl group-containing polymer, an epoxy group-containing polymer, and/or an amino group-containing polymer. In the preferred embodiment of the invention, the functional groups of the exfoliating polymer of (c) are the same as the functional groups of the polymer (a).

If used as exfoliating polymers of component (c), hydroxyl group and/or carboxyl group-containing polymers prepared from polymerizable ethylenically unsaturated monomers are typically copolymers of (meth)acrylic acid and/or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth) acrylate and 2-ethyl hexylacrylate, and vinyl aromatic compounds such as styrene, alpha-methyl styrene and vinyl toluene.

Epoxy functional groups may be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3–6.

Amino functional groups may be incorporated in to the polymer prepared from polymerizable ethylenically unsaturated monomers by copolymerizing one or more polymerizable ethylencially unsaturated monomers such as those described above with a tertiary or secondary nitrogen-containing alpha, beta-ethylenically unsaturated aminoalkyl monomer. Examples of suitable tertiary or secondary nitrogen-containing alpha, beta-ethylenically unsaturated aminoalkyl are those described in U.S. Pat. No. 3,853,803 at column 2, line 58 to column 3, line 21, incorporated herein by reference. Alternatively, amine functional groups may be incorporated into the polymer prepared from polymerizable ethylenically unsaturated monomers by first preparing an epoxy group-containing polymer, such as described above, and reacting the epoxy groups with an amine, for example, a secondary amine such as dialkyl- and dialkanolamines having 1 to 4 carbon atoms in the alkyl group.

Carbamate functional groups may be incorporated into the polymer prepared from polymerizable ethylenically unsaturated monomers by copolymerizing, for example, the above-described monomers with a carbamate functional vinyl monomer such as a carbamate functional alkyl ester of methacrylic acid. These carbamate functional alkyl esters are prepared by reacting, for example, a hydroxyalkyl carbamate, such as the reaction product of ammonia and ethylene carbonate or propylene carbonate, with methacrylic anhydride. Other carbamate functional vinyl monomers are, for instance, the reaction product of hydroxyethyl methacrylate, isophorone diisocyanate, and hydroxypropyl carbamate, or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328. Carbamate functional groups can also be incorporated into the acrylic polymer by reacting a hydroxyl functional acrylic polymer with a low molecular weight alkyl carbamate such as methyl carbamate. Also, hydroxyl functional acrylic polymers can be reacted with isocyanic acid to provide pendent carbamate groups. Likewise, hydroxyl functional acrylic polymers can be reacted with urea to provide pendent carbamate groups therefrom.

The polymers prepared from polymerizable ethylenically unsaturated monomers may be prepared by solution polymerization techniques in the presence of suitable catalysts such as organic peroxides or azo compounds, for example, benzoyl peroxide or N,N-azobis(isobutyronitrile). The polymerization may be carried out in an organic solution in which the monomers are soluble by techniques conventional in the art. Alternately, these polymers may be prepared by aqueous emulsion or dispersion polymerization techniques which are well known in the art. The ratio of reactants and reaction conditions are selected to result in an acrylic polymer with the desired pendent functionality.

Besides polymers prepared from polymerizable ethylenically unsaturated monomers, the layered silicate materials of (c) can be exfoliated with a polyester polymer. Polyester polymers useful in the coating compositions of the invention are typically the products of the condensation of polyhydric alcohols and polycarboxylic acids. Suitable polyhydric alcohols include ethylene glycol, neopentyl glycol, trimethylol propane and pentaerythritol. Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived form linseed oil, soya bean oil, tall oil, dehydrated castor oil or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamylation reaction. Preparation of examples of carbamate functional group-containing polyesters suitable for use as the exfoliating polymer of component (c) are as described in U.S. Pat. No. 5,593,733 at column 2, line 40 to column 4, line 9, incorporated herein by reference.

Polyurethane polymers containing terminal isocyanate or hydroxyl groups may also be used to exfoliate the layered silicate material of component (c). The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates are those described in U.S. Pat. No. 4,046,729 at column 5, line 26 to column 6, line 28, incorporated herein by reference. Examples of suitable polyols area those described in U.S. Pat. No. 4,046,729 at column 7, line 52 to column 10, line 35 incorporated herein by reference. Examples of suitable polyamines are those describe in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups may be introduced into polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate can also be employed.

Examples of polyether polymers suitable for use in the present invention include, but are not limited to, polyether polyols such as polyalkylene ether polyols which include those having the following structural formula:

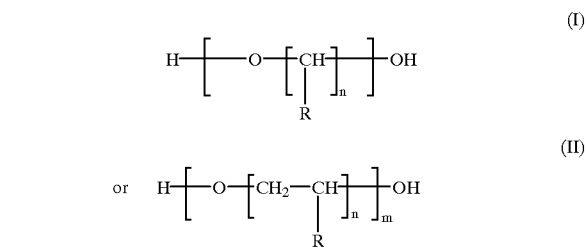

where the substituent R is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

In addition to the above-described polymers, the exfoliating polymer can also be a silicon based polymer, to include polysiloxane polymers having repeating —[—Si—O—]— units in the polymer backbone and, optionally, terminal and/or pendant functional groups such as hydroxyl, epoxy or carboxylic acid functional groups; and silicon containing polymers such as acrylic polymers, polyester polymers, polyether polymers and polyurethane polymers which contain hydrolyzable alkoxysilane groups.

Examples of polysiloxane polymers suitable for use as the exfoliating polymer in component (c) are polysiloxane polyols which are obtained by the dehydrogenation reaction between a polysiloxane hydride and an aliphatic polyhydric alcohol or polyoxyalkylene alcohol to introduce the alcoholic hydroxy groups onto the polysiloxane backbone. Also suitable are polysiloxane polyols obtained by the hydrosilylation reaction between a polysiloxane containing silicon hydride and a polyglycerol compound having an aliphatically unsaturated linkage in the molecule. Examples of such polyglycerol compounds are those obtained by the reaction of allyl alcohol and glycidol or by the reaction of diglycerin and allyl glycidyl ether, carried out in the presence of a catalytic amount of a Group VIII noble metal. Such polysiloxane polyol polymers are described in further detail in U.S. Pat. No. 4,431,789. These polysiloxane polyols may be further reacted via the pendant and/or terminal hydroxyl groups to provide various functional groups. For example, the polysiloxane polyol can be reacted with an anhydride to provide carboxylic acid functionality. Anhydrides useful for such reaction include hexahydrophthalic anhydride, methyl hexahydrophthalic anhydride, phthalic anhydride, trimellitic anhydride, succinic anhydride, substituted alkenyl anhydrides such as octenyl succinic anhydride and the like. Other useful polysiloxane polymers include epoxy functional polysiloxanes which are formed by reacting a polysiloxane-containing silicon hydride with allyl glycidyl ether such as those described in U.S. Pat. No. 5,248,789.

Examples of suitable silicon-containing acrylic polymers are those prepared from the free radical initiated co-polymerization of ethylenically unsaturated silicon-free monomers, for example, alkyl (meth)acrylates such as methyl (meth)acrylate, ethyl acrylate, and isobornyl (meth) acrylate, and vinyl aromatic monomers such as styrene, alpha methyl styrene and vinyl toluene, and the like; and at least one ethylenically unsaturated alkoxysilane or acyloxysilane, for example gamma-(meth) acryloxypropyltrimethoxysilane, gamma-(meth) acryloxypropyldimethoxysilane and gamma-methacryloxypropyltris(2-methoxyethoxy)silane. Such silicon-containing acrylic polymers are those described in U.S. Pat. No. 4,606,064 at column 3, line 8 to column 5, line 41 and column 6, lines 38–65, incorporated herein by reference.

Examples of other suitable silicon-containing acrylic polymers are those prepared from the reaction of a hydroxyl functional group-containing acrylic polymer with an organosilicon-containing material, for example, an organosilicate such as tetramethoxysilane, tetraethoxysilane, tetra-n-propoxysilane, methoxytriethoxysilane, dimethoxydiethoxysilane, trimethoxy-n-propoxysilane and the like. Such silicon-containing acrylic polymers are those described in U.S. Pat. No. 4,714,738 at column 3, line 18 to column 15, line 41, incorporated herein by reference.

Examples of other suitable silicon containing polymers are silicon-containing polyester polymers and silicon-containing polyether polymers such as those obtained from the reaction of a polyester polyol with an organosilicon-containing material and a polyether polyol with an organosilicon-containing material. Such silicon containing polyester polymers and silicon containing polyether polymers are those described in U.S. Pat. No. 4,623,697 at column 4, line 27 to column 13, line 18; column 13, line 47 to column 14, line 25; column 14, line 60 to column 15, line 14; and column 15, line 46 to column 17, line 68, incorporated herein by reference.

Additionally, silicon-containing polyurethane polymers suitable for use in the present invention can include the reaction product of an organic isocyanate or isocyanate prepolymer and an aminoalkyloxysilane such as those described in U.S. Pat. No. 4,628,076 at column 1, line 46 to column 10, line 14, incorporated herein by reference.

Typically, in the curable compositions of the invention, the layered silicate material is treated with an acid or acid solution to exchange the interlayer cations, e.g., $Na^+$ and $Ca^{+2}$, for an acidic proton. Intercalation is then accomplished by contacting the acidified layered silicate material with the exfoliating polymer. Exfoliation is achieved upon application of agitation or shear by any means which is commonly known in the art, for example, colloidal mills, high speed blenders, homogenizers and the like.

More specifically, exfoliation of the layered silicate material can be accomplished in a number of ways. The exfoliating polymer may be pretreated with an acid prior to the intercalation and exfoliation of the layered silicate material to provide, for example, cationic salt groups, such as amine salt groups, where the exfoliating polymer contains amino functional groups, which act to anchor the polymer to the layer surfaces (to effect intercalation and exfoliation and, if desired, enhance dispersion into an aqueous media). The layered silicate material may also be pretreated with acid prior to intercalation and exfoliation with the exfoliating polymer to exchange the interlayer cations for acidic protons, and to subsequently neutralize or react with the functional groups of the exfoliating polymer upon intercalation. Exfoliation is accomplished by applying agitation or shear to the intercalate/acid solution mixture. Additionally, the layered silicate material can be pretreated with an acid prior to intercalation and exfoliation to exchange the interlayer cations for acidic protons. The clay particles are then intercalated with the exfoliating polymer. Exfoliation is accomplished under agitation or shear, while the intercalate is subjected to an additional acid treatment. Alternatively, the layered silicate material may be intercalated and exfoliated directly with a functional group-containing polymer, such as an amino group-containing polymer or a carboxyl group-containing polymer.

Any acid which can exchange a proton for the exchangeable interlayer cation, effect neutralization of and/or react with the functional groups of the exfoliating polymer may be used in the above-described process. Examples of acids suitable for use in the curable coating compositions of the invention include, but are not limited to, sulfamic acid, lactic acid, acetic acid, oxalic acid, formic acid and the like.

In the curable coating compositions of the present invention the solids content of component (c) is typically 0.01 to 20, preferably from 0.1 weight percent to 2 weight percent, based on total solids content of the coating composition; and the weight ratio of the layered silicate material to the exfoliating polymer is preferably from 0.05 to 0.5:1. By "coating composition" is meant herein a composition which is deposited on a substrate from a fluid medium, such as a liquid medium, i.e., water, organic solvent or a mixed water and organic solvent, or from a fluidized powder, and which coalesces on the substrate to form a substantially continuous film.

As aforementioned, the curable coating compositions of the invention also comprise a polymer containing reactive functional groups (a). Preferably, the reactive functional groups of the polymer (a) are selected from at least one of OH, COOH, NCO, carboxylate, primary amine, secondary amine, amide, carbamates and epoxy functional groups. The polymer containing reactive functional groups (a) can be selected from any of a variety of polymers as are well known in the art. Examples of suitable polymers are those described above for the exfoliating polymer of (c).

The polymer containing reactive functional groups (a) is present in the coating compositions of the invention in an amount typically less than 50 weight percent, preferably less than 40 weight percent, based on the total weight of resin solids of the curable coating composition. Also, the polymer containing reactive functional groups (a) is typically present in the curable coating compositions of the invention in an amount of at least 2 weight percent, preferably at least 10 weight percent, and more preferably at least 25 weight percent, based on the total weight of resin solids of the curable coating composition. The polymer containing reactive functional groups (a) may be present in the curable coating compositions of the invention in an amount ranging between any combination of these values, inclusive of the recited values.

The curable coating compositions of the invention further comprise a curing agent containing functional groups which are reactive with the functional groups of (a).

Aminoplast resins and phenoplast resins and mixtures thereof, as curing agents for OH, COOH, amide and carbamate functional group-containing materials are well known in the art. Examples of aminoplast and phenoplast resins suitable as curing agents in the curable compositions of the present invention are those described in U.S. Pat. No. 3,919,351 at column 5, line 22 to column 6, line 25, incorporated herein by reference.

Polyisocyanates and blocked isocyanates as curing agents for OH and primary and/or secondary amino group-containing materials are well known in the art. Examples of polyisocyanates and blocked isocyanates suitable for use as curing agents in the curable compositions of the present invention are those described in U.S. Pat. No. 4,546,045 at column 5, lines 16 to 38; and in U.S. Pat. No. 5,468,802 at column 3, lines 48 to 60, both herein incorporated by reference.

Anhydrides as curing agents for OH and primary and/or secondary amino group-containing materials are well known in the art. Examples of anhydrides suitable for use in the curable coating compositions of the invention are those described in U.S. Pat. No. 4,798,746 at column 10, lines 16 to 50; and in U.S. Pat. No. 4,732,790 at column 3, lines 41 to 57, both herein incorporated by reference.

Polyepoxides as curing agents for COOH functional group-containing materials are well known in the art. Examples of polyepoxides suitable for use as curing agents in the curable coating compositions of the invention are those described in U.S. Pat. No. 4,681,811 at column 5, lines 33 to 58, herein incorporated by reference.

Polyacids as curing agents for epoxy functional group-containing materials are well known in the art. Examples of polyacids suitable for use as curing agents in the curable coating compositions of the invention are those described in U.S. Pat. No. 4,681,811 at column 6, line 45 to column 9, line 54, herein incorporated by reference.

Polyols, that is, materials having an average of two or more hydroxyl groups per molecule, commonly known in the art, can be used as curing agents for NCO functional group-containing materials, anhydrides and esters. Examples of such polyols are those described in U.S. Pat. No. 4,046,729 at column 7, line 52 to column 8, line 9; column 8, line 29 to column 9, line 66; and in U.S. Pat. No. 3,919,315 at column 2, line 64 to column 3, line 33, all incorporated herein by reference.

Polyamines can also be used as curing agents for NCO functional group-containing materials, and for carbonates and unhindered esters as well. Such polyamine curing agents are well known in the art. Examples of polyamines suitable for use as curing agents in the curable coating compositions of the invention are those described in U.S. Pat. No. 4,046,729 at column 6, line 61 to column 7, line 26, incorporated herein by reference.

The curing agent (b) is present in the coating compositions of the invention in an amount typically less than 65 weight percent, preferably less than 50 weight percent, based on the total weight of resin solids of the curable coating composition. Also, the curing agent (b) is typically present in the curable coating compositions of the invention in an amount of at least 5 weight percent, preferably at least 20 weight percent, and more preferably at least 30 weight percent, based on the total weight of resin solids of the curable coating composition. The curing agent (b) may be present in the curable coating compositions of the invention in an amount ranging between any combination of these values, inclusive of the recited values.

The curable coating compositions of the invention can be pigmented or unpigmented. Suitable pigments for color coats include opaque, transparent and translucent pigments generally known for use in coating applications. When pigment is used, it typically present in the composition in amounts such that the pigment to binder ratio is from about 0.03 to 6.0:1.

In addition to the foregoing components, the coating compositions of the invention may include one or more optional ingredients such as plasticizers, antioxidants, light stabilizers, mildewcides and fungicides, surfactants and flow control additives or catalysts as are well known in the art.

The components present in the curable coating composition of the present invention generally can be dissolved or dispersed in an organic solvent. Organic solvents which may be used include, for example, alcohols, ketones, aromatic hydrocarbons, glycol ethers, esters or mixtures thereof. In solvent-based coating compositions, organic solvent is typically present in amounts of 5 to 80 percent by weight based on total weight of the composition. Alternatively, the components of the curable coating compositions of the invention may be dispersed in aqueous media. For example, when the reactive functional groups of the polymer (a) are carboxylic acid groups, an amine may be used to neutralize the acid groups to form an emulsion of the polymer in water. Useful amines include, but are not limited to, N-ethylethanolamine, N-methylethanolamine, diethanolamine, N-phenylethanolamine and diisopropanolamine.

Whether the coating compositions are cured at ambient or thermal conditions is dependent upon the reactive functional groups of the polymer of component (a), the curing agent (b) and/or the reactive functional groups of the exfoliating polymer of component (c). The curable coating compositions of the invention can be pigmented or unpigmented.

The curable coating composition of the invention can be applied to a substrate by any conventional method such as brushing, dipping, flow coating, roll coating, conventional spraying, electrostatic spraying, and by the process of electrodeposition. Typically, they are most often applied by spraying and by electrodeposition. Usual spray techniques and equipment for air spraying and electrostatic spraying and either manual or automatic methods can be used.

The compositions can be applied by conventional methods over a wide variety of primed and unprimed substrates such as wood, metal, glass, cloth, leather, plastics, foams and the like; however, they are particularly useful over metal substrates.

The ambient temperature curable compositions, for example, those containing polyisocyanate or polyanhydride curing agents, can be cured at elevated temperatures to hasten the cure. An example would be forced air curing in a down draft booth at about 40° to 60° C. which is common in the automotive refinish industry. The ambient temperature curable compositions are usually prepared as a two (2) package system in which the curing agent is kept separate from the polymer containing reactive functional groups and component (c) when the layered silicate material is exfoliated with a polymer containing reactive functional groups. The packages are combined shortly before application.

The thermally curable compositions, for example, those containing a blocked isocyanate, aminoplast, phenoplast, polyepoxide or polyacid curing agent, can be prepared as a one package system.

The thermally curable coating compositions are cured at elevated temperatures, typically for 1 to 30 minutes at about 250° F. to about 450° F. (121° C. to 232° C.) with temperature primarily dependent upon the type of substrate used. Dwell time (i.e., time that the coated substrate is exposed to elevated temperature for curing) is dependent upon the cure temperature used as well as wet film thickness of the applied coating composition. For example, coated automotive elastomeric parts require a long dwell time at a lower cure temperature (e.g., 30 minutes/250° F. (121° C.)), while coated aluminum beverage containers require a very short dwell time at a very high cure temperature (e.g., 1 minute/375° F. (191° C.)).

The curable coating compositions of the invention are particularly useful as primers and as color and/or clear coats in color-clear composite coatings. The compositions of the invention in the pigmented form can be applied directly to a substrate to form a color coat. The color coat may be in the form of a primer for subsequent application of a top coat or may be a colored top coat. Alternatively, the coating composition of the invention can be unpigmented, in the form of a clear coat for application over a color coat (either a primer coat or a colored top coat). When used as a primer coating, thicknesses of 0.4 to 4.0 mils are typical. When used as a color top coat, coating thicknesses of about 0.5 to 4.0 mils are usual, and when used as a clear coat, coating thicknesses of about 1.5 to 4.0 mils are generally used.

In applying composite coatings using the curable coating composition of the present invention, the initially applied coating can be cured prior to the application of the second coat. Alternatively, the coating can be applied by a wet-on-wet technique in which the second coating is applied to the first coating (usually after a flash time at room temperature or slightly elevated temperature to remove solvent or diluent, but insufficient time to cure the coating) and the two coatings are co-cured in a single step.

Only one of the coatings in the composite coating needs to be based on the curable coating composition of the present invention. The other coating composition can be based on a film-forming system containing a thermoplastic and/or thermosetting film-forming resin well known in the art such as cellulosics, acrylics, polyurethanes, polyesters including alkyds, aminoplasts, epoxies and mixtures thereof. These film-forming resins are typically formulated with various other coatings ingredients such as pigments, solvents and optional ingredients mentioned above.

EXAMPLES

Example 1 describes the preparation of a water dispersible epoxy resin for use in the aqueous dispersions of the invention. Example 1-A describes the preparation of a non-pigmented aqueous dispersion of the water dispersible epoxy resin of Example 1. Example 2-A describes the preparation of an aqueous dispersion of the invention which contains a layered silicate material, PGV5 available from Nanocor, Inc. Examples 3-A and 4-A describe the preparation of aqueous dispersions of a conventional aluminum silicate clay and a conventional magnesium silicate talc, respectively. Comparative Example AA describes the preparation of an electrodeposition bath composition containing the non-pigmented aqueous dispersion of Example 1-A. Examples BB, CC and DD describe the preparation of electrodeposition bath compositions containing the pigmented aqueous dispersions of Example 2-A, 3-A and 4-A respectively.

Example 1

A water dispersible epoxy resin was prepared from the following ingredients:

| INGREDIENTS | WEIGHT (g) | EQUIVALENTS |
| --- | --- | --- |
| Charge I | | |
| DER 732[1] | 3523.94 | 11.0468 |
| Bisphenol A | 853.62 | 7.4877 |
| Mazon 1651[2] | 43.78 | |
| Charge II | | |
| Benzyldimethylamine | 8.25 | |
| Mazon 1651 | 17.16 | |
| Charge III | | |
| Mazon 1651 | 272.03 | |
| Charge IV | | |
| JEFFAMINE D-400[3] | 924.40 | 4.0673 |
| Mazon 1651 | 43.78 | |
| Charge V | | |
| Epon 880[4] (85% in Mazon 1651) | 112.36 | 0.5082 |
| Mazon 1651 | 17.16 | |

[1]Diglycidyl ether of polypropylene glycol (600 molecular weight) commercially available from Dow Chemical Corp.
[2]Butylcarbitol formal commercially available from BASF Corp.
[3]Polypropylene glycol diamine commercially available from Huntsman Chemical Corp.
[4]Diglycidyl ether of Bisphenol A commercially available from Shell Oil and Chemical Co.

Charge I was added to a suitable vessel equipped with a mechanical stirrer, a reflux condenser and a nitrogen inlet and heated to 130° C. under mild agitation. Charge II was then added and the reaction mixture was allowed to exotherm until reaching a temperature of 135° C. That temperature was held for approximately 2 hours until the reaction mixture had an epoxy equivalent weight of 1220 based on resin solids. Charge III and Charge IV were sequentially added to the reaction mixture which was cooled to 90° C. and held at that temperature for a period of 4.5 hours. The reaction mixture had a viscosity of J/K (as determined by a Gardner-Holt bubble viscosity tube with the sample reduced to 50% solids in 1-methoxy-2-propanol). Charge V was then added and the reaction mixture was held for 1.5 hours at 90° C. The epoxy resin thus prepared had a Gardner-Holt bubble viscosity of P.

Example 1-A

A non pigmented aqueous dispersion of the epoxy resin of Example 1 was prepared from a mixture of the following ingredients:

| INGREDIENTS | WEIGHT (g) | EQUIVALENTS |
|---|---|---|
| Charge I | | |
| Lactic acid solution (88% in water) | 232.33 | 2.2699 |
| Deionized water | 5513.11 | |
| Charge II | | |
| Epoxy resin of Example 1 | 5409.33 | |
| Charge III | | |
| Deionized water | 3771.21 | |

Charge I was added to a suitable vessel equipped with an agitator. Charge II was added under agitation and the mixture was then stirred for approximately 1.5 hours. Charge III was then added. The resulting dispersion had a theoretical resin solids of 35% and a Brookfield viscosity of 5800 centistokes per second (cps)(spindle #3 @ 12 rpm).

Example 2-A

In accordance with the present invention, an aqueous dispersion of the epoxy resin of Example 2 and a layered silicate material was prepared from a mixture of the following ingredients:

| Ingredients | Weight (g) | Equivalents |
|---|---|---|
| Charge I | | |
| Lactic acid solution (88% in water) | 106.37 | 0.2601 |
| PGV5[1] | 108.79 | |
| Charge II | | |
| Deionized water | 2828.43 | |
| Charge III | | |
| Epoxy resin of Example 1 | 1100.00 | |

[1]Montmorillonite clay material commercially available from Nanocor, Inc.

Charge I was added to a suitable vessel equipped with an agitator. Charge II was heated to boiling and then added under agitation. Charge III was added under agitation and the mixture was stirred for 1.5 hours. X-ray diffraction results indicate that the PGV5 clay is exfoliated in the dispersion with no observable $d_{001}$ diffraction peak.

Example 3-A

An aqueous dispersion of the epoxy resin of Example 3 and a conventional aluminum silicate clay was prepared from a mixture of the following ingredients:

| Ingredients | Weight (g) | Equivalents |
|---|---|---|
| Charge I | | |
| Lactic acid solution (88% in water) | 106.37 | 0.2601 |
| ASP 200[1] | 108.79 | |
| Charge II | | |
| Deionized water | 2828.43 | |
| Charge III | | |
| Epoxy resin of Example 1 | 1100.00 | |

[1]Aluminum silicate commercially available from Engelhard Corporation.

Charge I was added to a suitable vessel equipped with an agitator. Charge II was heated to boiling and then added under agitation. Charge III was added under agitation and the mixture was stirred for 1.5 hours.

Example 4-A

An aqueous dispersion of the epoxy resin of Example 1 and a conventional talc, i.e., magnesium silicate, was prepared from a mixture of the following ingredients:

| Ingredients | Weight (g) | Equivalents |
|---|---|---|
| Charge I | | |
| Lactic acid solution (88% in water) | 106.37 | 0.2601 |
| Talc[1] | 108.79 | |
| Charge II | | |
| Deionized water | 2828.43 | |
| Charge III | | |
| Epoxy resin of Example 1 | 1100.00 | |

[1]Magnesium silicate hydrate commercially available as A-5 from Naintsch Mineralwerke GmbH.

Charge I was added to a suitable vessel equipped with an agitator. Charge II was heated to boiling and then added under agitation. Charge III was added under agitation and the mixture was stirred for 1.5 hours.

Example AA

A comparative non-pigmented cationic electrodeposition bath containing the aqueous dispersion of Example 1-A was prepared from the following ingredients:

| INGREDIENTS | PARTS BY WEIGHT |
|---|---|
| Cationic epoxy resin[1] | 694.8 |
| Aqueous dispersion of Example 1-A | 101.9 |
| Butyl carbitol formal[2] | 11.0 |
| Microgel[3] | 41.3 |
| Catalyst[4] | 13.3 |
| Deionized Water | 1628.5 |

[1]A cationic epoxy based resin with blocked polyisocyanate crosslinker which is generally described as the main vehicle in Example VIIID of U.S. Pat. No. 5,767,191. The resin had a final solids of 44.7%.
[2]Plasticizer which is the reaction product of 2 moles of diethylene glycol butyl ether and 1 mole of formaldehyde, prepared as generally described in U.S. Pat. No. 4,891,111.
[3]A cationic microgel prepared as generally described in Examples A and B of U.S. Pat. No. 5,096,556, with the exception that acetic acid instead of lactic acid was used to disperse the soap of Example A, and EPON 828 solution was added after stripping rather than before in Example B. The resin had a final solids content of 17.9%.
[4]Catalyst paste containing 33% dibutyltin oxide, commercially available from PPG Industries Inc. as E 5269.

The ingredients were added sequentially to a suitable vessel under mild agitation. The final bath resin solids content was 14.7 weight percent based on total weight of solids of the electrodeposition bath.

Example BB

A cationic electrodeposition bath composition containing the aqueous dispersion of Example 2-A was prepared from the following ingredients:

| INGREDIENTS | PARTS BY WEIGHT |
| --- | --- |
| Cationic epoxy resin (as described in Example AA) | 694.8 |
| Aqueous dispersion of Example 2-A | 133.6 |
| Butyl carbitol formal | 11.0 |
| Microgel of Example AA | 41.3 |
| Catalyst of Example AA | 13.3 |
| Deionized Water | 1596.8 |

The ingredients were added sequentially to a suitable vessel under mild agitation. The bath resin solids content was 14.7 weight percent based on total weight of solids of the electrodeposition bath. The solids content of PGV5 clay was 0.94% based on total weight of bath solids.

Example CC

A cationic electrodeposition bath composition containing the aqueous dispersion of Example 3-A was prepared from the following ingredients:

| INGREDIENTS | PARTS BY WEIGHT |
| --- | --- |
| Cationic epoxy resin (as described in Example AA) | 694.8 |
| Aqueous dispersion of Example 3-A | 133.6 |
| Butyl carbitol formal | 11.0 |
| Microgel of Example AA | 41.3 |
| Catalyst of Example AA | 13.3 |
| Deionized Water | 1596.8 |

The ingredients were added sequentially to a suitable vessel under mild agitation. The final bath resin solids content was 14.7 weight percent based on total weight of solids in the electrodeposition bath. The solids content of ASP-200 Aluminum silicate was 0.94% based on total weight of bath solids.

Example DD

A cationic electrodeposition bath composition containing the aqueous dispersion of Example 4-A was prepared from the following ingredients:

| INGREDIENTS | PARTS BY WEIGHT |
| --- | --- |
| Cationic epoxy resin (as described in Example AA} | 694.8 |
| Aqueous dispersion of Example 4-A | 133.6 |
| Butyl carbitol formal | 11.0 |
| Microgel of Example AA | 41.3 |
| Catalyst of Example AA | 13.3 |
| Deionized Water | 1596.8 |

The ingredients were added sequentially to a suitable vessel under mild agitation. The final bath resin solids content was 14.7 weight percent based on total weight of solids in the electrodeposition bath. The solids content of magnesium silicate was 0.94% based on total weight of bath solids.

The electrodeposition bath compositions of Examples AA, BB, CC and DD described immediately above were ultrafiltered, thereby removing 20% of the total weight of the bath as ultrafiltrate. The ultrafiltrate was subsequently replaced with deionized water.

Electrocoating Procedure

Each of the electrocoating bath compositions prepared as described immediately above, were electrodeposited onto cold rolled steel substrate which had been pretreated with zinc phosphate pretreatment followed by a chrome rinse (commercially available as B952/P60 from ACT Laboratories). Bath temperature during the electrocoating process was 90° F. (32.2° C.) and coat-out time was 2 minutes for all bath compositions. Voltage was varied for each composition to achieve a cured film thickness of approximately 0.8 mils. The required voltage for each composition is listed in the following Table 1. After a deionized water rinse, the electrocoated test panels were subsequently cured in an electric oven at 340° F. (171.1° C.) for 30 minutes.

Testing Procedures

The cured electrocoat films were evaluated for film smoothness, crater count, and oil spot resistance. Film thickness was measured using a Fischer Permascope. Recorded film thickness is based on an average of four measurements. Film smoothness was measured using a Taylor-Hobson Surtronic 3+ profilometer. Recorded film smoothness is the average of three measurements. Results for both film thickness and film smoothness are reported in the following Table 1.

Crater count evaluates the resistance of coatings to cratering which can result from coating processing conditions. The front side of a four inch by six inch coated and cured B952/P60 test panels were visually inspected for the presence of craters. Results reported in the following Table I represent the actual number of craters observed upon inspection.

Oil spot contamination resistance testing evaluates the ability of an electrodeposited coating, upon cure, to resist crater formation due to contaminants carried into the bath with the substrate as discussed above. Panels were tested for oil spot resistance by spotting the top one-half of a B952/P60 test panel with TRIBOLICO medium oil and the bottom one-half with LUBECON ATS oil. These oils are representative of those typically used for chain lubrication in automotive assembly plants. The oil-spotted test panels were then electrocoated and cured as described above to give a cured film thickness of approximately 0.8 mils. Ratings for oil spot contamination resistance are reported in the following Table 1.

TABLE 1

| Example | Description | Voltage/ Film Build | Smoothness ($\mu$ inches) | Crater Count | Oil Spot* |
| --- | --- | --- | --- | --- | --- |
| AA | Comparative | 200 V/.82 mil | 6–7 | 56 | 1 |
| BB | PGV5 | 180 V/.85 mil | 4–5 | 5 | 3–4 |
| CC | ASP 200 | 190 V/.81 mil | 6 | 51 | 1 |
| DD | A-5 talc | 140 V/.83 mil | 4 | 60 | 1 |

*10 = best; 0 = worst

The results in Table 1 illustrate that electrodeposition bath compositions containing the PGV5 clay exhibit improved crater count and oil spot contamination resistance versus the non-pigmented comparative composition and the compositions containing conventional aluminum silicate clay (ASP-200) or magnesium silicate (A-5 talc). Additionally, film smoothness was not adversely affected by the addition of the PGV5 clay at the level tested.

We claim:

1. A curable coating composition comprising the following components:
   (a) a polymer containing reactive functional groups;
   (b) a curing agent containing functional groups which are reactive with the functional groups of (a); and
   (c) an acidified dispersion of exfoliated silicate prepared by
      (1) contacting a layer silicate having interlayer cations with an acid or acid solution to exchange the interlayer cations;
      (2) intercalating the acidified layer silicate of (1) with an exfoliating polymer; and
      (3) exfoliating the intercalated layer silicate of (2) by applying shear to the intercalated silicate/acid mixture, wherein said exfoliating polymer is compatible with the polymer (a) and the curing agent (b).

2. The coating composition of claim 1 wherein the reactive functional groups of the polymer (a) are selected from the group consisting of OH, COOH, NCO, carboxylate, primary amine, secondary amine, amide, carbamates and epoxy functional groups.

3. The coating composition of claim 1 wherein the reactive functional groups of the polymer (a) are OH functional groups.

4. The coating composition of claim 3 wherein the curing agent (b) is a polyisocyanate.

5. The coating composition of claim 3 wherein the curing agent (b) is selected from the group consisting of aminoplast and phenoplast and mixtures thereof.

6. The coating composition of claim 3 wherein the curing agent is a polyanhydride.

7. The coating composition of claim 3 wherein the layered silicate is exfoliated with a hydroxyl group-containing polymer.

8. The coating composition of claim 1 wherein the reactive functional groups of the polymer (a) are COOH functional groups.

9. The coating composition of claim 8 wherein the curing agent (b) is a polyepoxide.

10. The coating composition of claim 8 wherein the layered silicate is exfoliated with a carboxyl group-containing polymer.

11. The coating composition of claim 1 wherein the reactive functional groups of the polymer (a) are epoxy functional groups.

12. The coating composition of claim 11 wherein the curing agent (b) is a polycarboxylic acid.

13. The coating composition of claim 11 wherein the layered silicate is exfoliated with an epoxy group-containing polymer.

14. The coating composition of claim 11 wherein the reactive functional groups of the polymer (a) are at least one of primary amines and secondary amines.

15. The coating composition of claim 12 wherein the curing agent (b) is a polyisocyanate.

16. The coating composition of claim 14 wherein the layered silicate is exfoliated with an amino group-containing polymer.

17. The coating composition of claim 11 wherein the reactive functional groups of the polymer (a) are carbamate functional groups.

18. The coating composition of claim 17 wherein the curing agent (b) is an aminoplast.

19. The coating composition of claim 1 wherein the exfoliated silicate has an aspect ratio of 200 to 2000.

20. The coating composition of claim 1 wherein the layered silicate material is a montmorillonite clay.

21. The coating composition of claim 1 wherein the polymer of component (c) is selected from the group consisting of polymers prepared from polymerizable ethylenically unsaturated monomers, polyester polymers, polyurethane polymers, silicon-based polymers and polyether polymers.

22. The coating composition of claim 21 wherein the polymer of component (c) has a number average molecule weight of 500 to 50,000.

23. The coating composition of claim 1 wherein the exfoliating polymer is an amino-group containing polymer, the solids content of component (c) is from 0.01 weight percent to 20 weight percent, based on total solids content of the coating composition, and wherein the weight ratio of the exfoliated silicate to the amino group-containing polymer is 0.05 to 0.5:1.

24. The coating composition of claim 1 wherein the layered silicate is pretreated with an acid prior to exfoliation.

* * * * *